Aug. 10, 1954
W. STERN
2,685,697
HEAD SLOTTING MACHINE
Filed Jan. 23, 1951
3 Sheets-Sheet 1
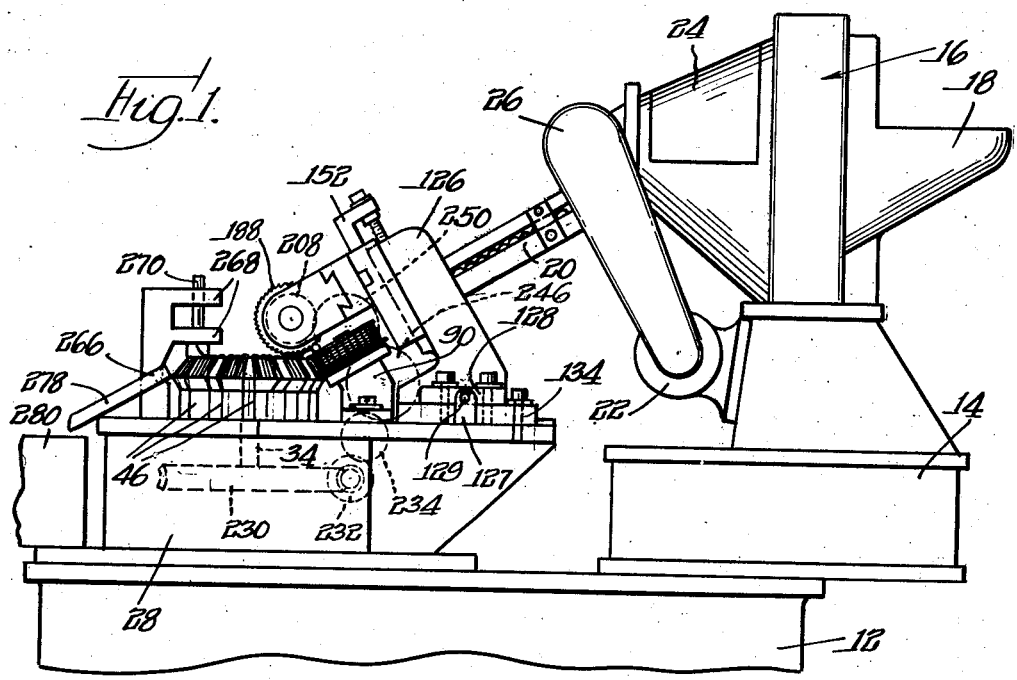
INVENTOR.
William Stern
BY
Moore, Olson & Trexler
attys

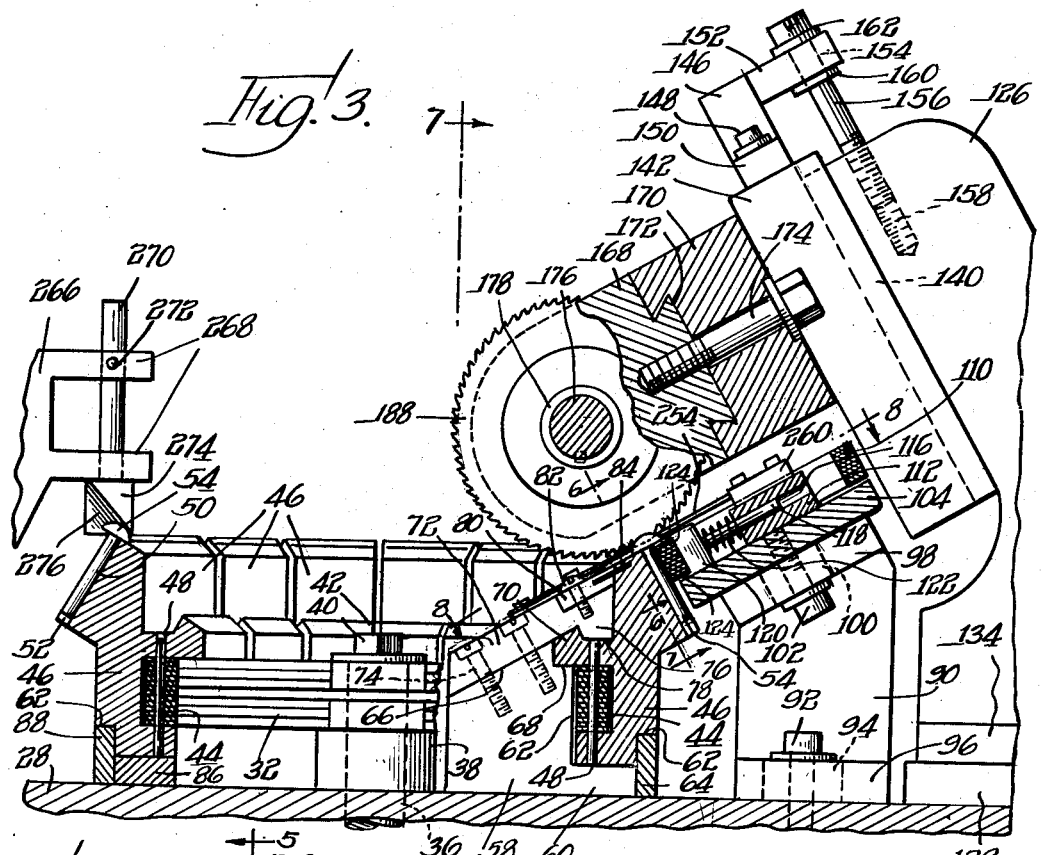
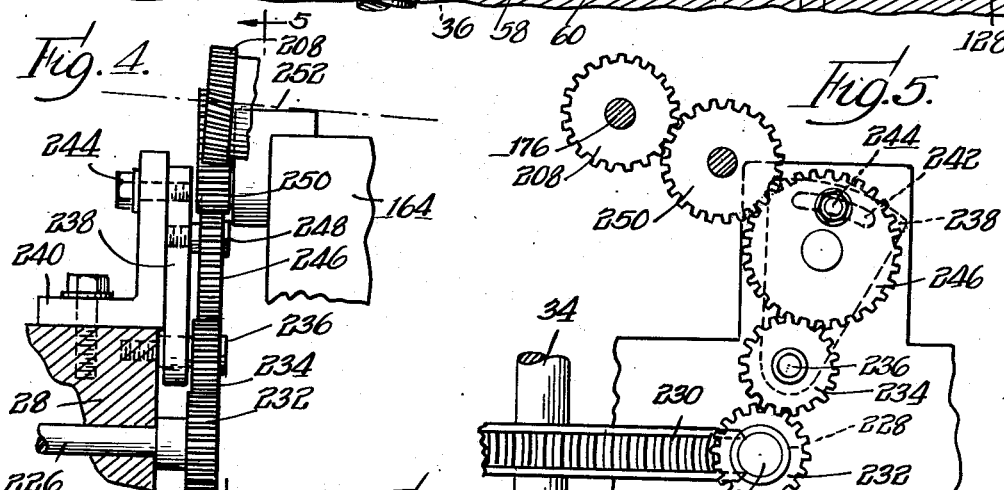
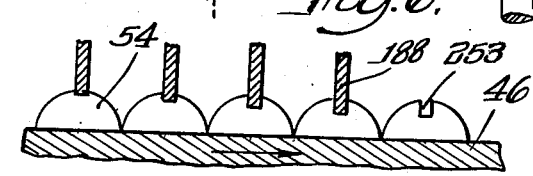

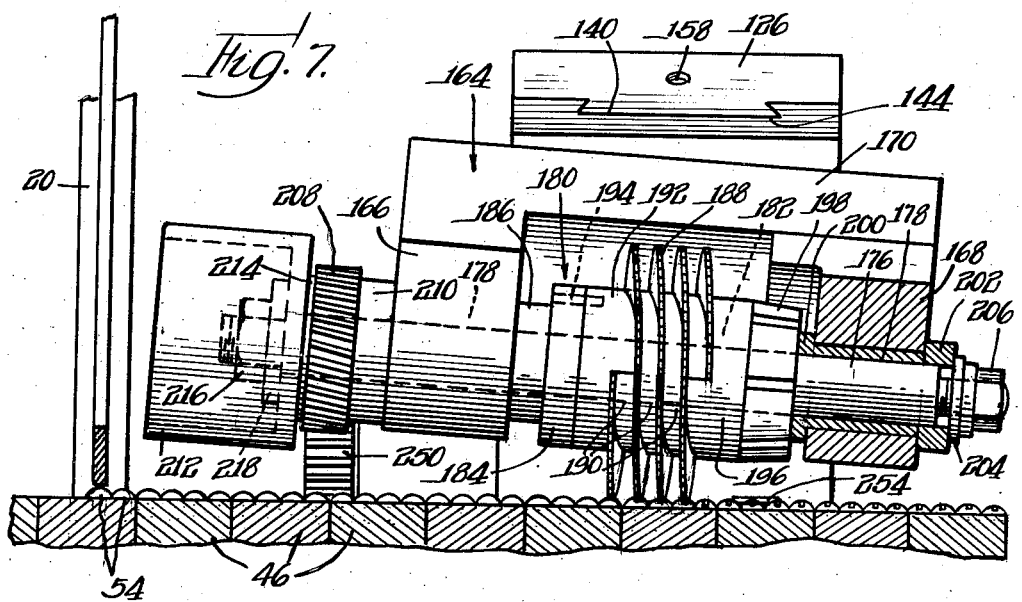
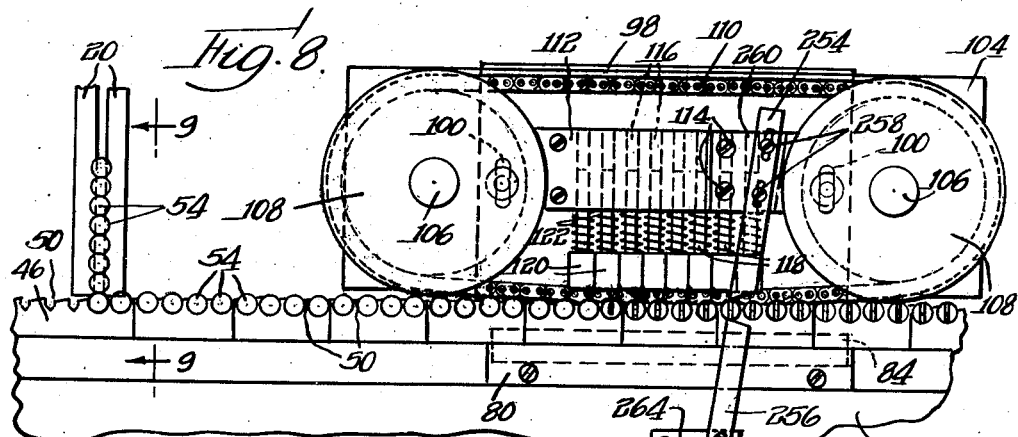
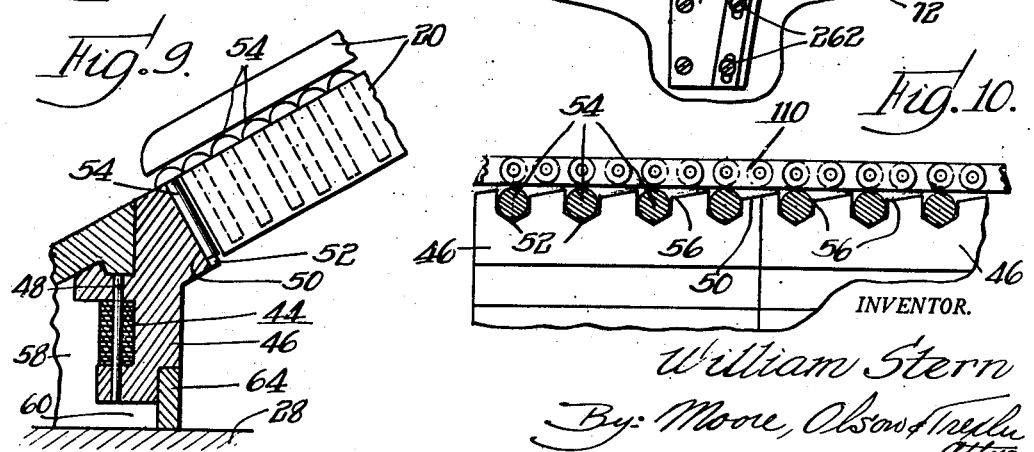
INVENTOR.
William Stern
By: Moore, Olson & Trexler
attys.

Patented Aug. 10, 1954

2,685,697

UNITED STATES PATENT OFFICE 2,685,697

HEAD SLOTTING MACHINE

William Stern, Park Ridge, Ill., assignor to Illinois Tool Works, Chicago, Ill., a corporation of Illinois Application January 23, 1951, Serial No. 207,404

1 Claim. (Cl. 10—5)

This invention is concerned generally with an article working machine or mechanism, and more particularly with a machine for slotting the heads of screws.

Machines as previously constructed for slotting the heads of screws or screw blanks have generally employed intermittent motion carriers, either in the form of rotating turrets or reciprocating carriers, to shift a screw into the path of a saw and to hold the screw stationary during transverse movement of the saw. Although the parts of such machines may be operated at very high speeds, the production of such machines is quite limited. High speed operation of the parts causes excessive wear and shortens the operating life of the machines. The present invention contemplates the provision of a screw head slotting machine wherein the capacity of the machine in respect to the number of screws slotted per minute is greatly increased while the parts are operated at a relatively slow speed, thus increasing the life of the machine and decreasing maintenance requirements.

Among the primary objects of the invention is the provision of a screw head slotting machine in which the screws are fed continuously from a delivery point to a discharge point and material is removed progressively from each screw head as it moves continuously between those points.

This invention contemplates the provision of means for continuously feeding screws past a cutting or slotting saw blade having its axis of rotation inclined to the path of feed of the screws progressively to remove material from each screw head and means for engaging the shank of each screw to support the screw against axial and transverse movement as it is carried by the feeding means past the cutting or slotting saw blade.

Yet another object of this invention is to provide a screw head slotting machine adapted to operate, without adjustment, on screws of diverse shank lengths.

A further object of this invention is to provide a screw head slotting machine having simple and efficient means for removing burrs formed on the screw heads by the slotting thereof.

A further important object of this invention is to provide in a screw head slotting machine a slotting saw which readily is adjustable to slot heads of different sizes.

The invention further contemplates the provision of a screw head slotting saw inclined relative to the path of movement of screws upon which said saw acts, means for shifting the saw parallel to its shaft, and means for driving the saw from a fixed shaft. A further object of this invention is to provide improved means for positively driving a shiftable saw shaft from a fixed driving shaft.

Screw head slotting machines as heretofore constructed necessarily have required transfer or ejecting mechanisms for shifting the screws from an inclined gravity feeding chute to a carrier. Such mechanisms have limited the speed of production, have increased the cost of the machines, and have been unreliable in operation. An object of this invention is to eliminate transfer or ejecting mechanisms and to feed screw elements directly from an inclined gravity feeding chute to a screw carrier and to provide a firm support for the heads of screws as the heads are presented to a slotting mechanism.

An object of this invention is to provide, in a screw head slotting machine, a screw carrier for receiving screw elements directly from an inclined gravity feeding chute wherein the walls of the recesses are relieved on one side to facilitate reception of screw elements and are unrelieved on the other side to facilitate retention of screw elements.

Yet another important object of this invention is to provide, in a screw head slotting machine, means for mounting a slotting saw for ready replacement for different slotting requirements or as the saw becomes worn through use.

A further object of this invention is to provide, in a screw head slotting machine having a slotting saw, means for holding screw elements against transverse forces imparted to the heads thereof by engagement of said slotting saw.

Another object of this invention is to provide, in a screw head slotting machine, means for so mounting a slotting saw in relation to a continuously moving screw carrier as to form symmetrical slots in the heads of screw elements.

Other and further objects and advantages of the invention will be apparent from the following description when taken in connection with the accompanying drawings wherein:

Fig. 1 is a side elevational view of a screw head slotting machine embodying the principles of my invention;

Fig. 2 is a plan view of the apparatus shown in Fig. 1;

Fig. 3 is a sectional view taken along the line 3—3 in Fig. 2;

Fig. 4 is a fragmentary view taken along the line 4—4 in Fig. 2;

Fig. 5 is a view taken along the line 5—5 of Fig. 4;

Fig. 6 is an enlarged somewhat schematic view showing the progressive removal of material from screw heads taken substantially along the line 6—6 of Fig. 3;

Fig. 7 is a detail view taken along the line 7—7 of Fig. 3;

Fig. 8 is a view taken along the line 8—8 of Fig. 3;

Fig. 9 is a view taken along the line 9—9 of Fig. 8; and

Fig. 10 is an enlarged fragmentary view of a portion of the mechanism shown in Fig. 8.

The screw feeding mechanism

The screw head slotting machine as shown generally in Figs. 1 and 2 includes a table or pedestal 12 upon which is mounted the base 14 of a screw hopper 16. The screw hopper is of the rotary type having a scoop or funnel-like portion 18 for receiving a heterogeneous mass of screw elements and feeding screw elements successively transversely in orderly fashion into a screw feed chute 20. The screw feed chute 20 is of the type having a pair of spaced apart rails for supporting screw elements by the heads with the shanks of the screw elements depending between the rails. An overhead bar or rail on the screw feed chute 20 is spaced just above the tops of the screw element heads to maintain the screw elements properly in position in the chute. In order to insure proper feeding of screw elements through the chute, suitable mechanism is provided to vibrate the chute. Such mechanism includes a motor 22, which may serve also to drive the rotary drum portion 24 of the hopper 16, and suitable driving mechanism located within a housing 26 and interconnecting the motor 22 and screw feed chute 20.

The pedestal 12 further supports a base 28 which in turn supports a pair of sprocket wheels 30 and 32. The sprocket wheel 30 is fixed on a driven shaft 34 as will be apparent hereinafter, while the sprocket wheel 32 is journaled for free rotation on a shaft 36. The shaft 36 extends through a spacer 38 (Fig. 3) which maintains the sprocket wheel 32 spaced above the base 28. A nut 40 threaded on an upstanding stud portion 42 maintains the sprocket wheel 32 on the shaft 36 and against the top of spacer 38. The shaft 36 preferably is mounted by any suitable conventional means for transverse shifting to maintain taut an endless chain 44 passed about the sprocket wheels 30 and 32. A plurality of screw carrying blocks 46 is carried by the chain 44. The blocks are secured to the chain by means of pins 48 pivotally interconnecting the links of the chain. For utmost traction and stability, the chain or belt 44 is of considerable height. The chain conveniently is constructed of two identical link chains or belts connected on top of one another, by means of the pins 42. The sprocket wheels 30 and 32 must be double to accommodate the doubled chain and each conveniently may consist of a pair of sprocket wheels stacked atop one another and keyed together.

Each block is provided with an upper or outer inclined face 50 having a plurality of elongated screw receiving apertures 52. The screw feed chute 20 terminates immediately adjacent the faces 50 as they are carried by the belt or chain 44 in order to supply screws 54 to the recess 52. (See particularly Figs. 8 and 9.) The sprocket wheels and chain are driven in a clockwise direction and the leading edges 56 of the recess are relieved to facilitate entrance of screws thereinto.

After receiving screws from the chute 20, the blocks 46 are carried past a back-up block 58 carried by the base 28. The back-up block 58 is provided with a vertical face 62 confronting the belt or chain 44 and a vertical portion of the screw carrying blocks. The screw carrying blocks are provided at their outer lower edges with relieved or shouldered portions 62 and a plate 64 secured to the table portion 60 of the back-up block 58 fits within these shouldered portions to maintain the screw carrying blocks in proper position against the back-up block 58. The upper face 66 of the back-up block is inclined and is provided at its upper edge with a relieved or shouldered portion 68 receiving rearwardly projecting sections 70 on the screw carrying blocks 46. A retaining plate 72 is secured to the upper face 66 of the back-up block by means of countersunk screws 74 and a longitudinal ridge or lip 76 depends into grooves 78 in the screw carrying blocks 46 to maintain the blocks in proper position against back-up block 58. An insert 80 secured in the top edge of the retaining plate 72 by means such as screws 82 carries a thin bronze plate 84 extending into slots in the backs of the screw carrying blocks 46 to preclude metal chips from passing down between the moving screw carrying blocks and the retaining plate 72 and back-up block 58.

The screw carrying blocks are unsupported except for the chains or belts 44 as they pass around the sprocket wheels 30 and 32 and are supported in the leading end of the back or left reach (Figs. 2 and 3) by a shelf 86 underlying the screw carrying blocks and by an upstanding plate or flange 88 fitting within the shouldered portions 62 of the screw carrying blocks.

Spaced laterally from the back-up block 58 is a bracket 90 secured to the base 28 by means such as bolts 92 passed through slots 94 in a transverse flange 96 of the bracket. The slots allow adjustment of the bracket toward and from the back-up block 58. A transverse flange 98 on the bracket 90 is provided with slots 100 through which are passed bolts 102, the bolts being threaded into a mounting plate 104. The mounting plate is provided with a pair of spaced shafts 106 on which rotatably mounted are pulley wheels 108. An endless link belt or chain 110 is passed about the pulleys 108 with one reach of the chain substantially abutting the front faces 50 of the screw carrying blocks as they pass past the back-up block 58. A recessed block or anchor 112 is secured to the top of the plate 110 by a plurality of screws 114. The anchor 112 is provided with a plurality of transverse cylindrical openings 116 receiving rods or pistons 118. The pistons 118 are provided at their outer ends with bearing blocks or abutments 120 and coil springs 122 compressed between the abutments and the anchor 112 urging the abutments against the chain 110 to maintain it against the outer inclined faces 50 of the screw carrying blocks 46. Narrow flanges 124 extend outwardly from the abutments 120 to overlie and underlie the chain or belt 110 to maintain it in proper position.

A bracket 126 having a base or flange 128 is secured atop the support or table 28. The flange 128 is provided with elongated slots 130 extending transversely of the machine and bolts 132 extend through these slots and are threaded into a plate 134. The plate 134 is provided with elongated slots 136 extending longitudinally of the machine and bolts 138 pass through these slots and are threaded into the supporting base or table 28. The bolts passing through the slots 130 and 136 allow the bracket 126 to be shifted longitudinally and transversely of the machine.

An upstanding bracket 127 on the base 28 is bifurcated at its upper end to receive a bolt 129 threaded into the plate 134. The bolt is provided with flanges 131 on each side of the bracket to prevent axial shifting of the bolt relative to the bracket. Rotation of the bolt therefore causes transverse shifting of the plate 134.

The upper portion of the bracket 126 (Figs. 2, 3 and 7) is inclined at an acute angle relative to the vertical and is provided with a dovetail flange 140 facing the screw carrying blocks 46 on the right reach of the conveyor. A slide 142 is provided with a dovetail slot or groove 144 cooperable with the dovetail flange 140.

A bracket 146 is mounted on top of the slide 142 by means of bolts 148 passing through laterally extending flanges 150 on the bracket. An arm 152 of the bracket 146 overlies the bracket 126 and is provided at its outer end with a U-shaped slot 154. A screw 156 is threaded into a bore 158 in the upper end of the bracket 126 and fits within the U-shaped slot 154. The screw is provided with an integral collar 160 underlying the bracket arm 152 and with a flange or collar 162 lying beneath the screw head and above the bracket arm 152. Rotation of the screw 156 to thread it into or out of the bore 158 causes the slide 142 to move down or up on the bracket 126.

A bifurcated bracket 164 is secured on the slide 142 by any suitable means and is inclined slightly from the horizontal. One arm 166 of the bracket 164 is integral while the other arm 168 is removable. The arm 168 is secured to the rear portion 170 of the bracket by means of a dovetail flange 172 on the arm fitting in a complemental groove in the back portion 170 and by a bolt 174 passing through the back portion and threaded into the arm.

An axle or shaft 176 is journaled in sleeve bearings 178 in the arms 166 and 168. A saw arbor 180 fits over the shaft 176 between the arms 166 and 168 and comprises a sleeve 182 and a radially extending flange 184. The arbor 180 is keyed to the shaft 176 for rotation therewith and is spaced from the arm 166 by a collar 186. A helical slotting saw 188 fits over the arbor 180 and consists of a plurality of segments, conveniently four, of one convolution each. The saw segments are spaced from one another by helical spacers 190 and the ends of successive segments register with one another to form a continuous blade. A spacer 192 is flat on one end and fits against the flange 184 to which it is secured for rotation by means of a pin 194. The other end of the spacer 192 fits against the first or left end (as seen in Fig. 7) of the helical saw or cutter 188. A spacer 196 fits between the other end of the saw and a nut 198 threaded on the end of the sleeve portion 182 of the arbor 180. A collar 200 spaces the end of the sleeve from the arm 168 and assembly and disassembly of the saw, arbor and shaft are facilitated by removal of the arm 168.

A collar 202 fits over the right end of the shaft 176 externally of the bracket 164 and a washer 204 and nut 206 fit about a reduced end portion of the shaft, the nut being threaded on the reduced portion and locked thereon by any suitable conventional means. A helical gear 208 is secured near the other end of the shaft 176 and has an integral hub 210 engaging the outer face of the arm 166. The gear 208 is keyed to the shaft 176 to drive the shaft. A steel cup 212 is spaced from the gear 208 by a washer or spacer 214 and a nut 216 threaded on the end of the shaft clamps a collar or washer 218 against the inner face of the cup. The cup 212 is filled with lead which imparts a high inertia to the slotting saw and structure rotating therewith and insures a constant rotational speed.

*The driving mechanism*

An electric motor 220 (Fig. 2) carries a small gear 222 on the end of its drive shaft and the gear 222 drives a large gear 224. The large gear is keyed or pinned to a drive shaft 226 journaled in suitable bearings in the support or base 28. A worm gear 228 is fixed on the shaft 226 and meshes with a worm wheel 230 (Fig. 5) fixed on the shaft 34 carrying the sprocket wheel 30. A spur gear 232 is fixed on the end of the shaft 226 and meshes with an idler gear 234. The idler gear 234 rotates freely on a shaft 236 which serves as a pivotal mounting for a wedge-shaped arm 238. An angle bracket 240 is bolted or otherwise secured to the top of the base 28 and is provided with an arcuate slot 242 which accommodates a bolt 244 threaded into the top of the arm 238. A second idler gear 246 of larger diameter is mounted loosely for rotation on a pin or shaft 248 and is meshed with the idler gear 236. A third idler gear 250 is freely rotatable on a shaft carried by a lug or ear 252 extending rearwardly from the bifurcated bracket 164 and meshes both with the second idler gear 246 and with the helical gear 208 on the saw shaft 176.

The axial lengths of the gears 232, 234, 246 and 250 are sufficient to allow relative axial shifting of the gears without disengagement upon adjusting the saw longitudinally of the reaches of screw carrying blocks by means of the slot and bolt connections 136 and 138. Movement of the saw radially by shifting of the slide 142 on the bracket 126 or by shifting the bracket transversely by means of the bolt and slot connections 130 and 132 causes the helical gear 208 and the third idler gear 250 to move radially relative to the drive shaft 226. To maintain the gears in driving engagement, the bolt 244 is loosened and the arm 238 is pivoted about its mounting shaft 236. After pivoting the arm 238 to maintain the gears 246 and 250 in driving engagement, the bolt 244 is tightened to lock the arm 238 in position.

It is to be understood that the saw could be of progressively increased diameter and the saw axis and drive shaft then could be parallel, although the uniform diameter saw and obliquely disposed axis and shaft are preferred.

*Operation*

Screw elements 54 sliding down the chute 20 are received in the slots or grooves 52 of the screw carrying blocks 46 as shown in Fig. 9. The blocks carry the screw elements toward the right as shown in Figs. 7 and 8 to be slotted. The screw elements have their shanks clamped against the screw carrying blocks by the spring biased reach of the chain 110 before engagement of the screw heads by the slotting saw 188. Such clamping prevents shifting of the screw elements while their heads are being slotted. It readily may be seen that no adjustment need be made to accommodate screw elements having different shank lengths for the lower ends of the shanks extend below the belt 110 (Fig. 3) and the distance which they extend below the belt is of no consequence. The inclination of the bifurcated bracket 146 causes the axis of the slotting saw 188 to be tilted slightly from a position parallel to the top surfaces of the screw carrying blocks fitting beneath the screw element heads. As seen in Fig. 6, the first (or left) convolution of the saw to encounter a screw element head removes a small amount of material from the top of the head. Successive increments of material are removed by successive convolutions of the saw to produce the finished slot 253, it being understood that the screw carrying blocks 46 and the saw 188 are driven at proper relative speeds so that the blocks move a distance equal to space between convolutions of the saw for each rotation of the saw.

Following the completion of the slotting of the screw element heads and while the screw elements remain clamped against the blocks 46 by the chain 110 and the blocks are held against transverse shifting by the back-up block 58, burrs formed on the screw element heads by slotting thereof are removed by a pair of de-burring tools or knives 254 and 256 (Figs. 7 and 8). The de-burring tool 254 is secured by screws or bolts 258 passing through elongated slots in the tool and threaded into a supporting block 260 suitably secured on the table or plate 104. The screw and slot connection allows adjustment of the tool or blade toward and from the path of the screw elements to compensate for wear of the sharpened point of the blade and for screw elements having heads of different diameter. The de-burring tool or blade 256 similarly is secured by a screw and slot connection 262 to a mounting block 264 carried on the plate 72 on top of the back-up block 58.

A bracket 266 on the base or support 28 has a pair of arms 268 overlying the leading end of the reach of the screw carrying blocks opposite the slotting saw. A rod 270 fits through aligned bores in the arms 268 and is secured in vertically adjustable position by means such as a set screw 272. An ejecting member 274 having an inclined deflecting face which preferably is concave is carried by the rod below the lower arm and in such position as to engage the heads of screw elements carried by the blocks 46 to shift the screw elements laterally from the recesses 52 in the blocks. The ejected screw elements drop into a chute 278 from which they pass into a receptacle 280.

It is apparent that the objectives of this invention have been achieved. Screw element heads are slotted by continuously moving mechanism operable to slot heads at a much more rapid rate than any of the intermittent motion mechanisms heretofore utilized for slotting screw heads. The specific example shown and described is for illustrative purposes only and various changes can be made in the details thereof without departing from the spirit and scope of the invention as expressed in the following claim.

I claim:

In an apparatus for slotting the heads of screw elements a rotary slotting tool having a helical slotting edge for cutting slots in heads of supported screw elements, an endless screw element conveyor disposed for movement along a predetermined linear path in the vicinity of the slotting edge of said helical head slotting tool and in general parallelism with the axis of said tool, a plurality of supporting and positioning members on the conveyor presenting uniformly spaced pockets for accommodating shanks of screw elements, said pockets extending substantially radially with respect to the axis of the tool so as to expose the heads of supported screw members for slotting purposes in a plane coincident with the helical slotting edge of the tool and in spaced relation conforming with the lead of said helical slotting edge, means for rotatably supporting and positioning said tool with the slotting edge thereof located immediately adjacent the outer open extremities of said pockets, said rotary tool having peripheral slotting teeth which are so disposed that upon rotation of the tool said teeth will exert pressure axially and transversely of the heads of a plurality of supported screw elements in a direction to force the clamping sides of said heads against the adjacent surface of the supporting member and to force the peripheral portion of said screw element shanks in the vicinity of the heads thereof transversely against the surfaces which define the adjacent bottom portions of the complementary pockets, pressure applying means consisting of an endless beltlike means having a portion thereof adjacently superimposing the shank accommodating pockets of said endless conveyor means and movable in synchronism therewith so to apply pressure simultaneously to a plurality of shanks of screw elements on said conveyor as the exposed heads of said screw elements are moved across the helical slotting edge of said rotary tool, whereby to counteract the tendency of the free extremities of the shanks of the screw elements to be canted out of their respective pockets as a result of the aforesaid pressure exerted by the slotting tool against the heads of said screw elements, means for driving said endless conveyor means continuously at a uniform rate proportionate to the rotative speed of said head slotting tool to move the heads of supported screw elements successively into predetermined positions of registration with said helical slotting edge, and a deburring tool positioned adjacent said endless pressure applying means for deburring the heads of slotted screw elements while the shanks thereof are being held within the pockets by said pressure applying means.

References Cited in the file of this patent

UNITED STATES PATENTS

| Number | Name | Date |
| --- | --- | --- |
| 513,334 | Mettler | Jan. 23, 1894 |
| 1,269,370 | Botenstein | June 11, 1918 |
| 1,510,729 | Weisner | Oct. 7, 1924 |
| 1,921,403 | Bell | Aug. 8, 1933 |
| 2,531,240 | Wilcox | Nov. 21, 1950 |
| 2,540,058 | Stern | Jan. 30, 1951 |

FOREIGN PATENTS

| Number | Country | Date |
| --- | --- | --- |
| 68,590 | Sweden | Oct. 8, 1927 |